US012594966B2

(12) United States Patent
Clawson et al.

(10) Patent No.: US 12,594,966 B2
(45) Date of Patent: Apr. 7, 2026

(54) REFERENCE TRAJECTORY VALIDATING AND COLLISION CHECKING MANAGEMENT

(71) Applicant: Zoox, Inc., Foster City, CA (US)

(72) Inventors: Taylor Scott Clawson, Castro Valley, CA (US); Olivier Amaury Toupet, Escondido, CA (US)

(73) Assignee: Zoox, Inc., Foster City, CA (US)

( * ) Notice: Subject to any disclaimer, the term of this patent is extended or adjusted under 35 U.S.C. 154(b) by 327 days.

(21) Appl. No.: 17/875,700

(22) Filed: Jul. 28, 2022

(65) Prior Publication Data

US 2024/0034356 A1 Feb. 1, 2024

(51) Int. Cl.
B60W 30/095 (2012.01)
B60W 60/00 (2020.01)

(52) U.S. Cl.
CPC .... B60W 60/0016 (2020.02); B60W 30/0953 (2013.01); B60W 60/00272 (2020.02); B60W 60/00274 (2020.02)

(58) Field of Classification Search
CPC ......... B60W 30/0953; B60W 30/0956; B60W 30/095; B60W 60/0011; B60W 30/09; B60W 60/0016; B60W 60/00274; B60W 60/00272; B60W 2554/802; G05D 1/0212; G05D 1/0214; G05D 1/646; G05D 1/622; G05D 1/693
See application file for complete search history.

(56) References Cited

U.S. PATENT DOCUMENTS

| | | | | |
|---|---|---|---|---|
| 4,939,650 A | * | 7/1990 | Nishikawa | ........... G05D 1/0255 |
| | | | | 180/167 |
| 2013/0173115 A1 | | 7/2013 | Gunia | |
| 2015/0198953 A1 | * | 7/2015 | Peake | .................. B62D 15/025 |
| | | | | 701/23 |
| 2017/0036675 A1 | * | 2/2017 | Neads | ................. B60W 30/165 |

(Continued)

FOREIGN PATENT DOCUMENTS

| | | | | | |
|---|---|---|---|---|---|
| CN | 111857152 A | * | 10/2020 | ........... G05D 1/0217 |
| EP | 0346537 A1 | | 12/1989 | |
| WO | 2018063250 A1 | | 4/2018 | |

OTHER PUBLICATIONS

PCT Search Report and Written Opinion mailed Nov. 7, 2023 for PCT Application No. PCT/US2023/070685, "Reference Trajectory Validating and Collision Checking Management", 11 pages.

*Primary Examiner* — Khoi H Tran
*Assistant Examiner* — Tanner L Cullen
(74) *Attorney, Agent, or Firm* — Lee & Hayes, P.C.

(57) ABSTRACT

Techniques for determining that a reference trajectory is free of intersections or potential collisions with objects are discussed herein. Trajectories being generated by a primary computing device of a vehicle can be utilized to select or determine a reference trajectory to be followed by the vehicle. A secondary computing device of the vehicle can identify a current offset from the reference trajectory and utilize the offset with a kinematics model to determine a trajectory that is predicted for the vehicle to drive to return to the reference trajectory. Validation of the reference trajectory may be based on predicted collision data determined using the tracker trajectory. The predicted collision data can be utilized to control the vehicle to follow the reference trajectory or a stop trajectory.

20 Claims, 5 Drawing Sheets

(56)        References Cited

U.S. PATENT DOCUMENTS

| | | | |
|---|---|---|---|
| 2019/0310644 A1* | 10/2019 | Zhang | G01C 21/3453 |
| 2020/0148201 A1* | 5/2020 | King | G05D 1/0221 |
| 2021/0061275 A1 | 3/2021 | Takahama | |
| 2021/0300409 A1* | 9/2021 | Matsunaga | G06V 20/588 |
| 2021/0370921 A1* | 12/2021 | Silva | B60W 60/0027 |
| 2022/0176992 A1* | 6/2022 | Nemoto | B60W 50/029 |
| 2022/0289179 A1* | 9/2022 | Thomas | B60W 60/0027 |
| 2023/0185304 A1* | 6/2023 | Wuthishuwong | B60W 30/0956 |
| | | | 701/26 |

* cited by examiner

500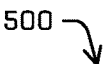

RECEIVE A REFERENCE TRAJECTORY
502

DETERMINE AN OFFSET OF THE VEHICLE
504

DETERMINE A PREDICTED TRACKER TRAJECTORY THAT THE VEHICLE WILL FOLLOW
506

DETERMINE PREDICTED COLLISION DATA
508

VALIDATE THE REFERENCE TRAJECTORY
510

THE REFERENCE TRAJECTORY
VALIDATED TO BE A VALID REFERENCE TRAJECTORY?
512

No

YES

CONTROL THE VEHICLE TO FOLLOW AN
ALTERNATE TRAJECTORY
514

CONTROL THE VEHICLE TO FOLLOW THE
REFERENCE TRAJECTORY
516

FIG. 5

REFERENCE TRAJECTORY VALIDATING AND COLLISION CHECKING MANAGEMENT

BACKGROUND

Certain systems, such as autonomous vehicles may include computing systems utilized to generate trajectories and control the vehicles based on the trajectories, as well as error and status data associated with the vehicles. For example, a vehicle trajectory generated by a vehicle computing system may indicate desired states of the vehicle and/or controls to issue to the vehicle at discrete locations and/or times. The vehicle computing system may perform collision checking based on the vehicle trajectory. However, differences between vehicle locations utilized for generation of the trajectories and actual vehicle locations may result in inaccuracies in the collision checking which may, in certain situations, result in unsafe operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 depicts an example process for reference trajectory validating and collision checking management, in accordance with examples of the disclosure.

DETAILED DESCRIPTION

Figure 1:
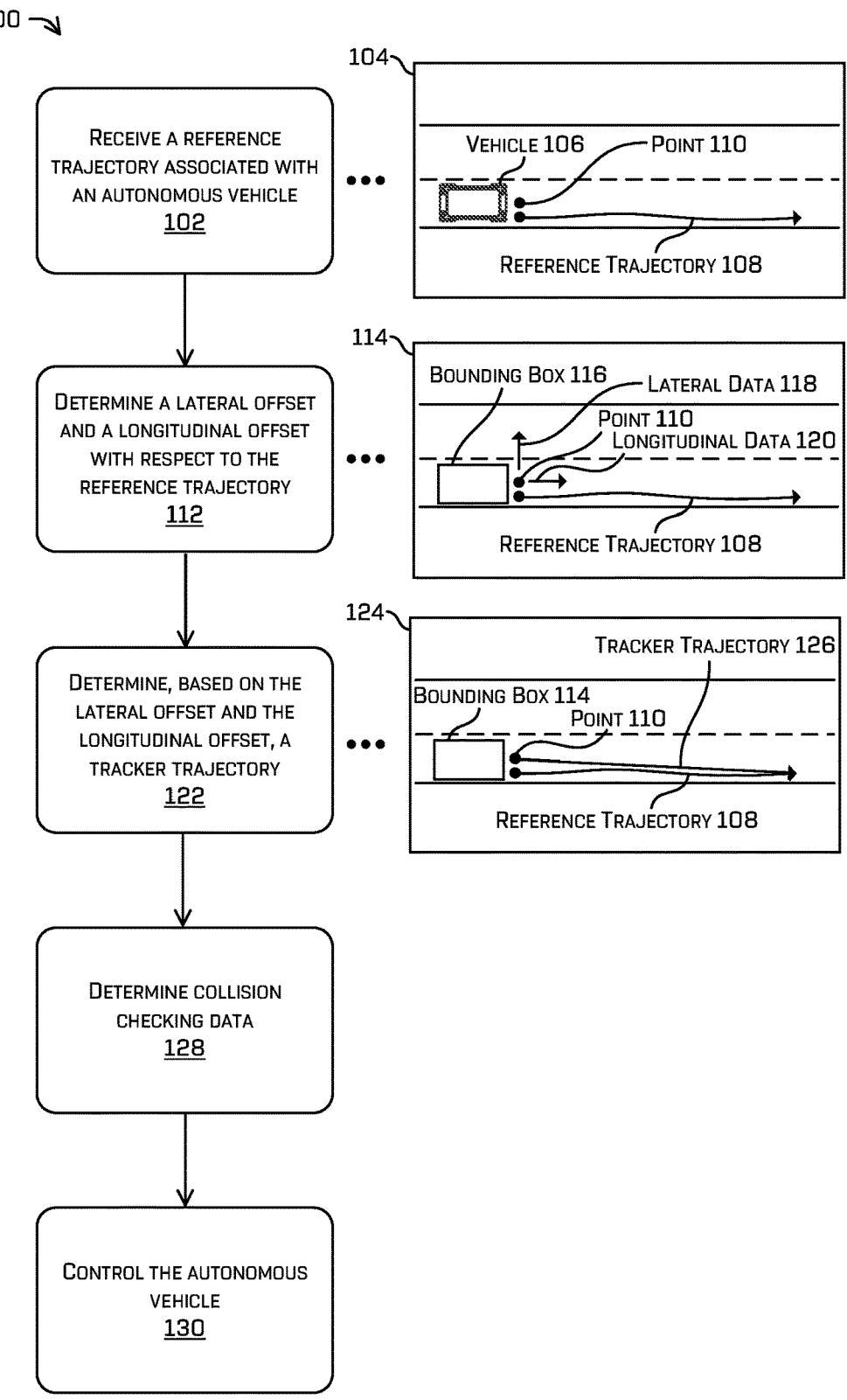
FIG. 1 is a pictorial flow diagram of an example process for reference trajectory validating and collision checking management, in accordance with examples of the disclosure.

Techniques for determining that a reference trajectory is free of intersections or potential collisions are discussed herein. For instance, a vehicle can utilize a primary computing device to generate a trajectory (e.g., referred to as a reference trajectory or a first trajectory) and a second computing device to validate the reference trajectory. The primary computing device can generate trajectories, select/determine an optimized trajectory from among the trajectories as the reference trajectory to be followed by the vehicle, and provide the reference trajectory to the secondary computing device. The secondary computing device can identify a point (e.g., waypoint, location, etc.) associated with the reference trajectory and offset information associated with the point. The offset information, which can include lateral offsets and longitudinal offsets, can be utilized along with a motion model (e.g., a kinematics and/or dynamics model) to determine a trajectory utilized for collision checking. The trajectory utilized for the collision checking can be determined as a tracker trajectory (e.g., a second trajectory) that the vehicle is predicted to drive (or follow) to converge to the reference trajectory. The secondary computing device can validate the reference trajectory based on predicted collision data associated with estimated positions of the vehicle along the tracker trajectory. The predicted collision data can be utilized to control the vehicle to follow the reference trajectory or a stop trajectory (or a safe-stop trajectory, a stopping trajectory, etc.). By utilizing the tracker trajectory to identify the predicted collision data (e.g., a corresponding likelihood of collision), the reference trajectory can be utilized to control the vehicle based on accurate (e.g., real-time or near real-time) current and predicted information associated with the vehicle.

In some cases, a vehicle (e.g., an autonomous vehicle) travelling through an environment can include a vehicle computing system utilized to perform trajectory generation and preliminary collision checking. The vehicle computing system can include a primary computing device with a planning component to generate trajectories associated with the vehicle. The trajectories can be generated to enable the vehicle to be safely and legally controlled, while avoiding any possible interactions (e.g., collisions or near-miss collisions) with objects in the environment. The planning component can select or otherwise determine an optimized trajectory based on characteristics associated with the optimized trajectory being more closely aligned with corresponding priorities and/or corresponding preferences than one or more remaining trajectories. The planning component can output the optimized trajectory as the reference trajectory. Additional examples of detecting objects and determining trajectories for vehicles to follow can be found, for example, in U.S. patent application Ser. No. 15/843,512 titled "Trajectory Generation Using Curvature Segments" and filed Dec. 15, 2017, the entirety of which is herein incorporated by reference and for all purposes.

The vehicle computing system can include a secondary computing device with a tracker trajectory component to simulate a trajectory (which may be referred to as a tracker trajectory, an estimated trajectory, a simulated trajectory, a predicted trajectory, and the like) along which the vehicle is expected to travel, based on offsets from the reference trajectory. The tracker trajectory component can simulate the trajectory that the vehicle is expected to follow based on the reference trajectory and based on current data (e.g., a current location) of the vehicle and a point associated with the reference trajectory. The current data utilized to generate the predicted trajectory can include, for example, current lateral data and current longitudinal data. The simulated trajectory, which can be identified as a predicted trajectory associated with the vehicle, can be generated based on the current data and a vehicle motion model (e.g., a kinematics model and/or dynamics model).

For example, the kinematics model can be utilized to determine the predicted trajectory based on a lateral offset and a longitudinal offset with respect to a location (e.g., a current location) (or "current position") (e.g., a point, such as a waypoint, having a lateral coordinate and a longitudinal coordinate) associated with the reference trajectory. The point associated with the reference trajectory can be received from the primary computing device. The kinematics model, which can be used for a constant time period over a fixed horizon, can be integrated to project (e.g., orthogonally project) the current lateral data and the current longitudinal data onto the reference trajectory, as projected lateral data (e.g., the lateral component of the point) and projected longitudinal data (e.g., the longitudinal component of the point), respectively.

The motion model (e.g., the kinematics model) can be utilized, along with a lane-keeping tracker and/or a least squares model, by the tracker trajectory component of the secondary computing device to determine a next position (e.g., a next point) of the vehicle along the tracker trajectory.

By way of example, the motion model can be utilized to determine the tracker trajectory that the vehicle is predicted to follow to return to the reference trajectory, based on the current position (e.g., a current point) of the vehicle along the tracker trajectory. In some examples, the lane-keeping tracker can be utilized along with the kinematics model to determine the next point associated with the tracker trajectory, based on the current lateral data. In those or other examples, the kinematics model can be utilized along with a least squares model to determine the next point, based on a control command (e.g., a control command determined utilizing the current lateral data and/or the current longitudinal data) input into the kinematics model. A lateral error can be determined based on a difference between the current lateral data and the projected lateral data. The lateral error can be identified as the lateral offset. The longitudinal error can be determined based on a difference between the current longitudinal data (e.g., a current longitudinal velocity and acceleration) and the projected longitudinal data (e.g., an intended velocity and acceleration along the reference trajectory). The longitudinal error can be identified as the longitudinal offset. Such an estimated trajectory may be generated iteratively using the same process per time step (e.g., determining a control, propagating the vehicle forward using a model, determine a difference between a new state and a desired state, etc.).

The predicted trajectory can be identified by the tracker trajectory component, based on the lateral offset and the longitudinal offset, as a tracker trajectory that the autonomous vehicle is predicted to follow to converge to the reference trajectory. The kinematics model can be iteratively used, as discussed above, until a tracker trajectory point (e.g., a point on the tracker trajectory determined based on the kinematics model) i) projects onto a stop point on the reference trajectory, or ii) aligns with a fixed time horizon.

The vehicle computing system can include a collision checking component utilized to perform collision checking based on the tracker trajectory. The collision checking component can perform the collision checking by generating a vehicle bounding box associated with the vehicle, and an object bounding box associated with an object in the environment. The vehicle bounding box can be propagated along the tracker trajectory and can be utilized to determine a likelihood of collision associated with the object, based on the object bounding box being propagated along an object trajectory of the object. The likelihood of collision can be determined for the tracker trajectory point, which is identified by the tracker trajectory component based on the lateral offset and the longitudinal offset. The collision checking component can utilize the tracker trajectory to validate the reference trajectory as a validated reference trajectory, and output, as a control trajectory, the validated reference trajectory based on determining there is no likelihood of collision associated with the tracker trajectory. In some examples, the collision checking component can output, as the control trajectory, an alternate trajectory, such as a safe stop trajectory, based on determining there is a likelihood of collision associated with the tracker trajectory. The control trajectory can be utilized by a tracker component to control the vehicle.

As illustrated by these examples, the techniques described herein can improve the functioning, safety, and efficiency of vehicles (e.g., driver controlled vehicles with safety systems, semi-autonomous vehicles, autonomous vehicles, robotic platforms, systems, etc.) traversing through environments. In various examples, the tracker trajectory component of the secondary computing device can receive reference trajectory information from the planning component of the primary computing device. In these examples, the tracker trajectory component can utilize the kinematics model to determine tracker trajectory information, based on lateral data and longitudinal data with respect with a point of the reference trajectory. The tracker trajectory information can include a tracker trajectory associated with current and up-to-date vehicle location information. The tracker trajectory component can provide the tracker trajectory information to the collision checking component, which can utilize the tracker trajectory, rather than the reference trajectory, to validate the reference trajectory.

Even in those examples in which lateral and/or longitudinal error is incorporated into collision checks using the reference trajectory alone by dilating one or more dimensions of a bounding box (or polygon) representing the vehicle, such techniques may lead to overly conservative estimates of collision checking, which may cause brake checking or problems planning or traversing through constricted areas. By planning controls in accordance with the reference trajectory and utilizing the tracker trajectory to perform collision checking, the vehicle can avoid errors caused by stale data and/or inconsistencies that may occur due to differences between the current vehicle location and the vehicle location utilized to generate the reference trajectory (e.g., due to errors, drift, etc.). For instance, the techniques described herein using results of the collision checking performed based on the tracker trajectory to determine an output (or selected) trajectory, can provide improvements over conventional systems in both safety and efficiency.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any third of the two.

Figure 4:
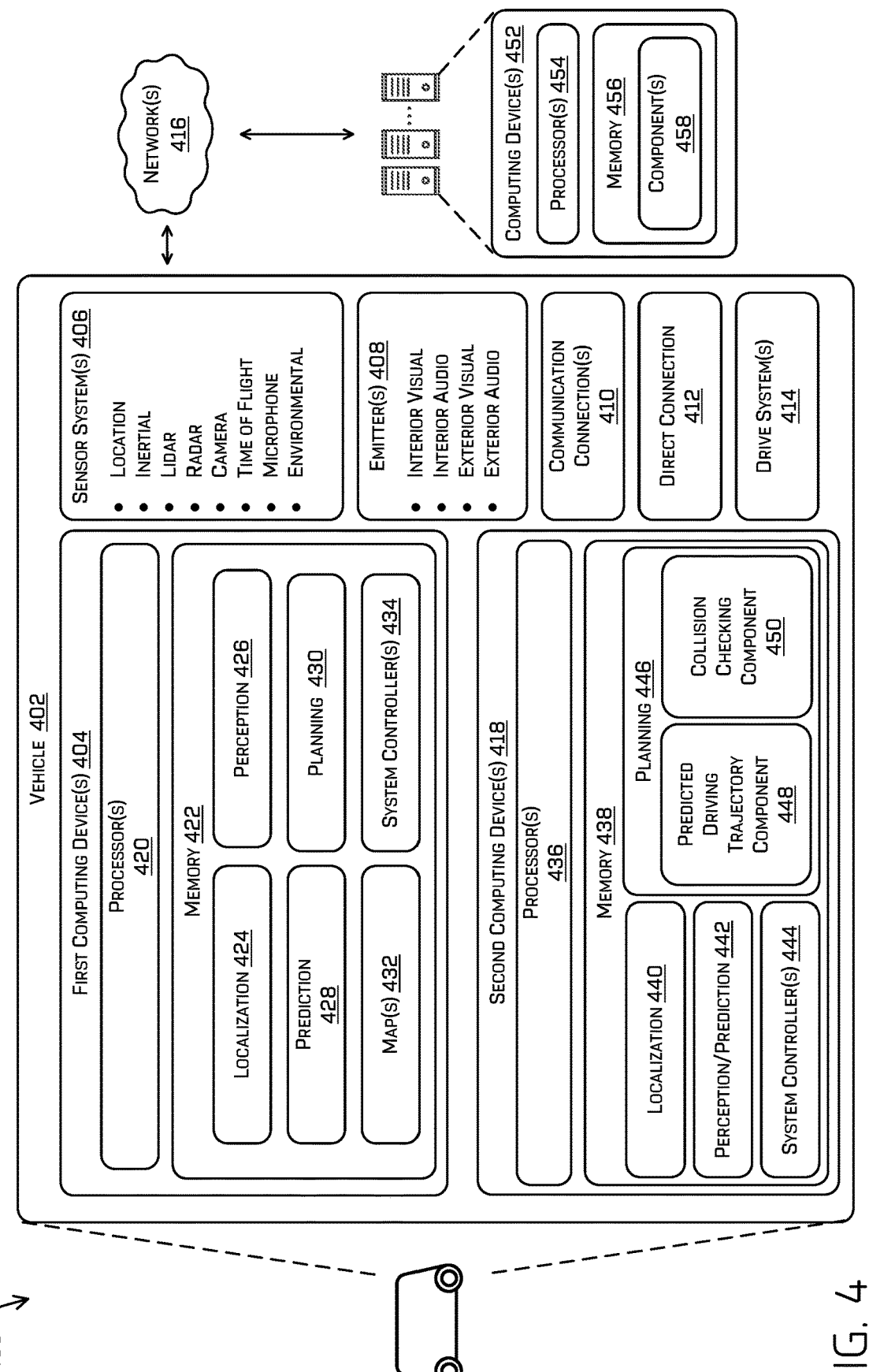
FIG. 4 depicts is a block diagram of an example system for implementing the techniques described herein.

FIG. 1 is a pictorial flow diagram of an example process 100 for determining that a reference trajectory is free of intersections or potential collisions with objects, in accordance with examples of the disclosure. In examples, one or more operations of the process 100 may be implemented by a vehicle computing system, such as by using one or more of the components and systems illustrated in FIG. 4 and described below. For example, one or more components and systems can include the first computing device(s) 404 and the second computing device(s) 418 illustrated in FIG. 4. In examples, the one or more operations of the process 100 may be performed by a remote system in communication with a vehicle, such as the computing device(s) 452 illustrated in FIG. 4. In still other examples, the one or more operations of the process 100 may be performed by a combination of a remote system and vehicle computing systems. However, the process 100 is not limited to being performed by such components and systems, and the components and systems of FIG. 4 are not limited to performing the process 100.

An operation 102 can include receiving a reference trajectory associated with a vehicle (e.g., an autonomous vehicle). Receiving the reference trajectory can include receiving, by a secondary computing device (or secondary computing component), an optimized trajectory that an autonomous vehicle is controlled to drive (or follow). In some examples, the reference trajectory can include steering and/or acceleration data, location and associated time points where the vehicle is expected to be, and the like.

The optimized trajectory can be received from a primary computing device (or primary computing component), based on multiple candidate trajectories generated by the primary computing device. The candidate trajectories may be determined based on detection of objects in the environment in which the vehicle is traveling and, in some examples, predicted trajectories of moving objects in the environment. The candidate trajectories generated by the primary computing device can be utilized by the primary computing device to select the optimized trajectory from among the candidate trajectories. The optimized trajectory can be transmitted, as the reference trajectory, by the primary computing device and received by the secondary computing device. Such an optimized trajectory may comprise a nominal trajectory for traversing an environment as determined in accordance with various systems such as, for example, as described in U.S. Pat. No. 11,048,260 entitled "Adaptive Scaling in Trajectory Generation", the entire contents of which are hereby incorporated by reference.

The objects and the predicted object trajectories can be determined by the primary computing device based on sensor data associated with the environment. The sensor data, such as image data, radar data, lidar data, etc., can be received by the primary computing device and from sensors utilized to capture the sensor data. In some examples, such sensors may be local to the vehicle or remote from the vehicle. The sensor data may be associated with and may identify various objects within the environment. The objects encountered within an environment can include dynamic objects that are moving or capable of movement (e.g., vehicles, motorcycles, bicycles, pedestrians, animals, etc.), and/or static objects (e.g., buildings, road surfaces, trees, signs, barriers, parked vehicles, etc.). The primary computing device can determine information about the objects detected in the environment. The object information can include bounding boxes, object segmentation information, classification information, etc.

An initial start position of the vehicle can be utilized to determine a location (e.g., a point) associated with the vehicle. The initial start position, which can be identified as the point, can be determined based on various types of information associated with the vehicle. In some examples, the point can be received by the secondary computing system and from the primary computing device. The point can be associated with the reference trajectory 108, as discussed below.

An example 104 illustrates a vehicle 106 that may be located in an environment. The vehicle 106 may be configured with and/or in communication with a vehicle computing system, including the primary computing device and the secondary computing device. The primary computing device of the vehicle 106 can receive and/or determine a trajectory (e.g., a reference trajectory) 108 to be utilized, for example, to navigate the vehicle 106 through the environment.

An initial start position of the vehicle 106 can be utilized to determine a location (or a current position) (e.g., a point) 110 associated with the vehicle 106. The initial start position, which can be identified as the point, can be determined based on location data (e.g., a geographic location), orientation data (e.g., a pose, a tilt, etc.), movement data (e.g., a velocity, an acceleration, etc.), and various other data types associated with the vehicle. The point 110 can be associated with at least one of a vehicle point (e.g., a center point of a front bumper), a metric (e.g., a predetermined distance, such as a predetermined longitudinal distance, from the vehicle point), and/or any other types of characteristics and/or metrics. In some examples, the point 110 can be a point at a center of the vehicle 106, with the point 110 being at same lateral distances from both sides of the vehicle 106 and same longitudinal distances from both ends of the vehicle 106. The point 110, which can be associated with, and/or determined based on, a current trajectory, such as the reference trajectory 108, can be received from the primary computing device. In some examples, the vehicle 106 (and the point 110) may not be located exactly on the reference trajectory 108 because of errors, vehicle drift or slip, etc., caused by real-word obstacles or conditions such as ice, snow, rain, potholes, tire slip, and the like.

An operation 112 can include determining a lateral offset and a longitudinal offset with respect to the reference trajectory. The lateral offset and the longitudinal offset can be determined with respect to the point 110. The lateral offset and the longitudinal offset can be determined based on, respectively, determining a distance between an actual location of the vehicle 106 (or a predicted location of the vehicle 106) and a corresponding point on the reference trajectory 108.

In some examples, the lateral offset and the longitudinal offset can be determined based on errors associated with a predicted location of the vehicle 106. The lateral offset can be determined based on a lateral error, including one or more lateral errors associated with a yaw and/or or a heading of the vehicle 106, the heading indicating whether the vehicle 106 (e.g., a vehicle point) is at a position (e.g., a point) on the reference trajectory or at a position adjacent to the reference trajectory. By way of example, the lateral offset can include a yaw offset and/or a heading offset. The lateral error(s) can be determined based on one or more differences between a yaw (e.g., an intended yaw) and/or a heading (e.g., an intended heading) associated with the reference trajectory 108 and, respectively, a current yaw and/or a current heading of the vehicle 106. The longitudinal offset can be determined based on a longitudinal error, including one or more longitudinal errors associated with a velocity and/or an acceleration of the vehicle 106. The longitudinal error(s) can be determined based on one or more differences between a velocity (e.g., an intended velocity) and/or an acceleration (e.g., an intended acceleration) associated with the reference trajectory 108 and, respectively, a current velocity and/or a current acceleration of the vehicle 106. The lateral offset and the longitudinal offset can be determined by the secondary computing component. The lateral offset and the longitudinal offset can be determined with respect to the point 110 at the initial start position.

The primary computing device of the vehicle 106 may also, or instead, receive and/or determine vehicle data such as a vehicle bounding box representing a position of the vehicle 106 in the environment.

An example 114 illustrates a bounding box 116 associated with the vehicle 106. The bounding box 116 can be identified and/or generated based on the vehicle 106. Characteristics associated with the vehicle 106 can be utilized to generate the bounding box 116. The characteristics utilized to generate the bounding box 116 can include localization data (e.g., a position), orientation data (e.g., a pose, yaw, tilt, roll, etc.), and/or other types of characteristics associated with the vehicle 106. The bounding box 116 can include data representing (e.g., approximate, estimated, and/or detected)

boundaries and/or other data associated with the vehicle 106. The bounding box 116 can include data representing a discretized top-down view of the vehicle 106. Such data may include data that represents particular parts or aspects of the vehicle 106.

The bounding box 116 can represent a position of the vehicle 106 in the environment. In some examples, the bounding box 116 can be generated at a location associated with any portion of the vehicle 106, such as a portion (e.g., a side point) of a front bumper (e.g., a front bumper side point utilized to identify an outside front corner of the bounding box 116), a portion (e.g., a center portion) of a rear axle (e.g., a rear axle center point utilized to identify a center point of the bounding box 116 that is closer to an end of the bounding box 116 than to another end of the bounding box 116), and/or any other portion of the vehicle 106.

Vehicle tracker data can be identified and/or generated by the vehicle 106. The vehicle tracker data can be generated by the secondary computing device of the vehicle 106. The vehicle tracker data can include lateral data 118 and longitudinal data 120. The offset data may indicate a distance from the reference trajectory and may include lateral offset data (or lateral data) 118 (e.g., a current lateral offset) and longitudinal offset data (or longitudinal data) 120 (e.g., a current longitudinal offset). The lateral data 118 and the longitudinal data 120 can be identified with respect to the point 110. A vehicle motion model (e.g., a kinematics model, a dynamics model, a machine learned (ML) model, etc.) can be utilized to determine a predicted trajectory (e.g., the tracker trajectory, as discussed below), based on the lateral data 118 and the longitudinal data 120 with respect to the point 110.

Although various techniques can be implemented utilizing the kinematics model as discussed throughout this disclosure, it is not limited as such. Any techniques as discussed herein can be implemented utilizing any type of motion model in a similar way as for the kinematic model.

An operation 122 can include determining based on the lateral offset and the longitudinal offset, a tracker trajectory. In some examples, expected lateral offset data and/or expected longitudinal offset data can be determined for several portions of the reference trajectory and can be used to generate the tracker trajectory. The tracker trajectory, which can be associated with the vehicle 106, can be generated by the secondary computing device of the vehicle 106. The tracker trajectory can simulate a trajectory along which the vehicle 106 is expected to travel, based on the bounding box 116, the current data of the vehicle 106, and/or the point 110. The current data can include, for example, the current lateral data and the current longitudinal data. The simulated trajectory, which can be identified as a predicted trajectory associated with the vehicle, can be generated based on the current data and the motion model (e.g., the kinematics model). The kinematics model, which can be iteratively used for a constant time period over a fixed horizon, can be integrated to project (e.g., orthogonally project) the current lateral data and the current longitudinal data onto the reference trajectory, as projected lateral data (e.g., the lateral component of the point) and projected longitudinal data (e.g., the longitudinal component of the point), respectively. By way of example, the kinematics model can be utilized, along with a lane-keeping tracker and/or a least squares model, as discussed below in further detail with respect to FIG. 2, to determine a next location (e.g., a next point) associated with the bounding box 116. The predicted trajectory can be identified as the tracker trajectory that the vehicle 106 is predicted to follow to converge to the reference trajectory 108.

An example 124 illustrates a tracker trajectory 126 associated with the vehicle 106. The tracker trajectory 126 can be generated utilizing the kinematics model, based on the bounding box 116, the current data (e.g., the lateral offset and the longitudinal offset) of the vehicle 106, and/or the point 110.

An operation 128 can include determining collision checking data. The collision checking data can be generated by the second computing device of the vehicle 106, based on the bounding box 116 (and/or other geometric representation of the vehicle traveling along the tracker trajectory) in conjunction with detections and/or predicted motions of detected objects as may be determined by either the primary computer system and/or the secondary computer system. The bounding box 116 can be propagated along the tracker trajectory 126 and utilized to determine a likelihood of collision associated with an object in the environment. The likelihood of collision associated with the object can be determined based on an object bounding box being propagated along an object trajectory of the object. Additional examples of determining perception information utilized for trajectory selection can be found, for example, in U.S. patent application Ser. No. 17/514,542 titled "Collision Avoidance and Mitigation in Autonomous Vehicles" and filed Oct. 29, 2021, the entirety of which is herein incorporated by reference and for all purposes.

An operation 130 can include controlling the vehicle 106. The vehicle 106 can be controlled based on the likelihood of collision associated with the tracker trajectory 126 and the object trajectory of the object in the environment. The likelihood of collision associated with the tracker trajectory 126 and the object trajectory can be utilized to validate the reference trajectory 108, as a validated reference trajectory (or a valid reference trajectory). In some examples, the reference trajectory 108 can be validated as the validated reference trajectory based on determining there is no likelihood of collision associated with the tracker trajectory. The validated reference trajectory can be output as a control trajectory utilized to control the vehicle 106. Additional examples of utilizing status and/or error data identified by safety system components to validate and select trajectories can be found, for example, in U.S. patent application Ser. No. 17/842,469 titled "Vehicle Safety System" and filed Jun. 16, 2022, the entirety of which is herein incorporated by reference and for all purposes.

In some examples, the collision checking component can output, as the control trajectory, an alternate trajectory, such as a safe stop trajectory. The safe stop trajectory can be identified from among one or more safe stop trajectories (e.g., one or more of a first safe stop trajectory, a second safe stop trajectory, etc.) having differing longitudinal deceleration profiles. The alternate trajectory can be output as the control trajectory based on determining there is a likelihood of collision associated with the tracker trajectory. The alternate trajectory being output as the control trajectory can be utilized to control the vehicle 106 to reduce the likelihood of collision, and/or to control the vehicle 106 to avoid a potential collision with the object.

Figure 2:
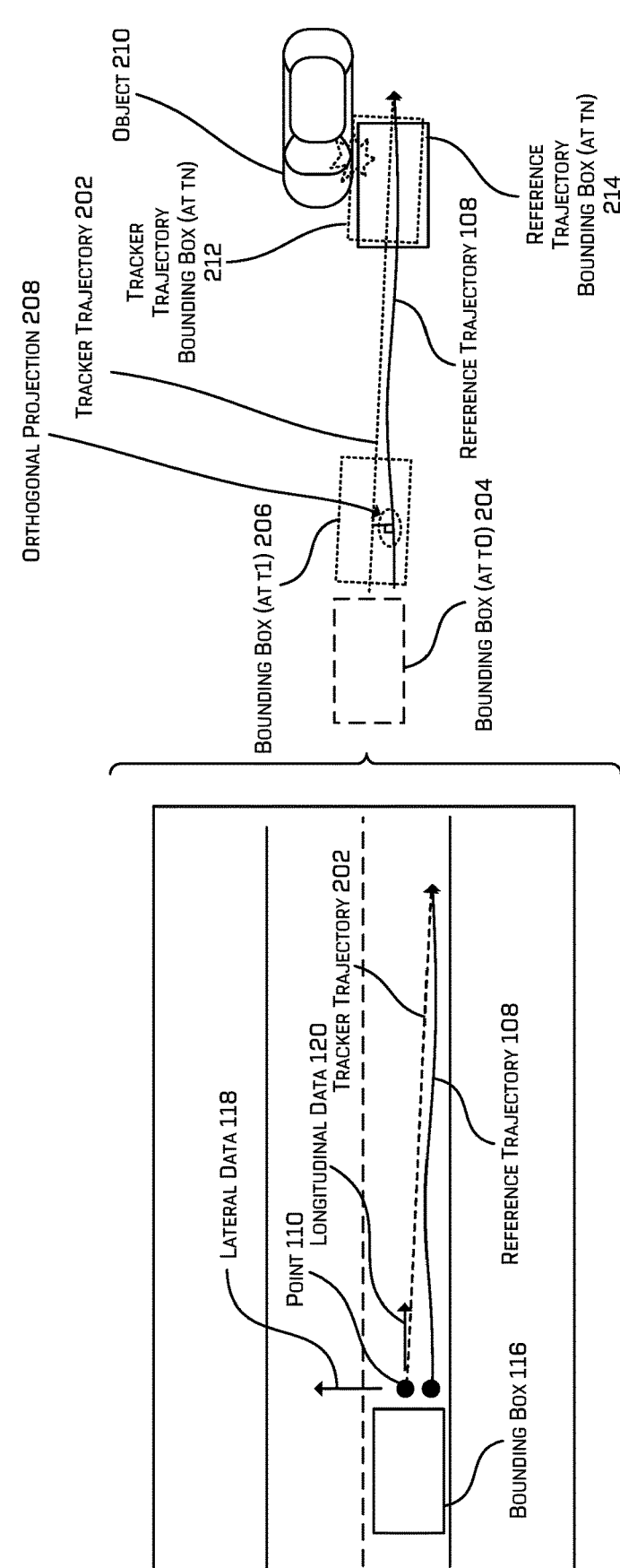
FIG. 2 is a schematic diagram for tracker trajectory generation, in accordance with examples of the disclosure.

FIG. 2 is a schematic diagram 200 for tracker trajectory generation, in accordance with examples of the disclosure. Tracker trajectory generation can include generating a tracker trajectory 202, as depicted via a dotted line in FIG. 2 to indicate generation of the tracker trajectory 202 being performed. The tracker trajectory 202 can be implemented as the tracker trajectory 126, as discussed above with reference to FIG. 1 and depicted via a solid line to indicate generation of the tracker trajectory 126 having been completed. A predicted trajectory can be generated as the tracker trajectory 202 that the vehicle 106 is predicted to follow to converge to the reference trajectory 108, discussed above with reference to FIG. 1.

An optimized trajectory can be identified as the reference trajectory 108, which can be generated from among multiple candidate trajectories. Any number of multiple candidate trajectories can be generated and analyzed to determine (e.g., select) the optimized trajectory. Characteristics utilized to select the optimized trajectory can include characteristics associated with current and/or predicted movement (e.g., vehicle speed, acceleration, pose, location, etc.), safety (e.g., current and/or predicted distances from objects in the environment), comfort (e.g., levels and speeds of changes in movement), efficiency (e.g., levels of energy expenditure), drivability (e.g., abilities of vehicle components to enable performance of maneuvers), resource conservation (e.g., amounts of resources, such as compute, network, and/or memory resources, required to perform operations), and/or various types of other characteristics.

The tracker trajectory 202 can be generated based on the lateral data 118 and/or the longitudinal data 120, which can be identified with respect to the point 110 (and or several points along the reference trajectory), as discussed above with reference to FIG. 1. A simulated trajectory, which can be identified as a predicted trajectory associated with the vehicle, can be generated as the tracker trajectory 202 based on the current data (e.g., one or more of the lateral data 118, the longitudinal data 120, etc.) and a vehicle motion model (e.g., a kinematics model) (e.g., a set of equations defining how the vehicle 106 behaves based on one or more constraints).

In some examples, the lateral data 118 and the longitudinal data 120, which can be determined based on the point 110, can be determined. By way of example, the lateral data 118 and the longitudinal data 120 can be utilized to determine a steering direction associated with the lateral data 118. The lateral data 118 and/or the longitudinal data 120 can be determined as a closed form solution and utilized to determine a predicted steering command that the vehicle might use to return to the reference trajectory 108. The process can then be repeated to generate the tracker trajectory 108.

A lateral error can be determined based on a difference between the current lateral data (e.g., a current yaw and/or heading) and the projected lateral data (e.g., an intended yaw and/or heading). By way of example, the lateral error can be determined based on a difference between a current position of the vehicle 106 (and/or estimated position for a future state of the vehicle) and the reference trajectory 108. The lateral error can be identified as the lateral offset of the lateral data 118. A longitudinal error can be determined based on a difference between the current longitudinal data (e.g., a current longitudinal velocity and acceleration) and the projected longitudinal data (e.g., an intended velocity and acceleration along the reference trajectory). By way of example, the longitudinal error can be determined based on a difference between a current position of the vehicle 106 (and/or estimated position for a future state of the vehicle) and the reference trajectory 108. The difference can include a distance, measured perpendicularly with respect to a point of the reference trajectory 108, between a point of the vehicle 106 (e.g., the point at the center of the vehicle 106) and a point on the reference trajectory 108. The longitudinal error can be identified as the longitudinal offset of the longitudinal data

120. The predicted trajectory can be determined based on the lateral offset and the longitudinal offset, as the tracker trajectory 202.

The current lateral data and the current longitudinal data can be projected (e.g., orthogonally projected) onto the reference trajectory 108, as projected lateral data (e.g., the lateral component of the point) and projected longitudinal data (e.g., the longitudinal component of the point), respectively. By way of example, the projected data can be identified by projecting (e.g., orthogonally projecting) a point of the vehicle 106 (e.g., a point at a center of the vehicle 106) onto the reference trajectory 108. The current lateral data and the current longitudinal data can be orthogonally projected onto the reference trajectory 108, based on an orthogonal projection (e.g., an orthogonal projection similar to the orthogonal projection 208, discussed below). In some examples, offset data, which can include one or more offsets (e.g., the lateral offset and/or the longitudinal offset), can be determined as an orthogonal projection of a current position of the vehicle 106 on the reference trajectory 108.

The offset data associated with the vehicle 106 at a current position (e.g., a current point at a current time (e.g., a time t0)), and the reference trajectory, can be utilized to determine one or more control commands (e.g., steering and/or speed commands) for the vehicle 106. The control command(s) can be input into the kinematics model, to determine a next position of the vehicle 106 along the tracker trajectory 108. In some examples, the next position of the vehicle 106 along the tracker trajectory 108 can include a next point (e.g., a point at a next time step) at a time t1. By way of example, the orthogonally projected point can be utilized, along with the kinematics model to determine the next point (e.g., a center point of the bounding box 206 at the time t1). In some examples, the next point (e.g., a point at a center of the bounding box 206) can be orthogonally projected, as depicted in FIG. 2, and utilized, along with the kinematics model to determine another next point.

The kinematics model can be utilized along with a control model (e.g., a model utilizing a lane-keeping tracker and/or a least squares model) for determining the tracker trajectory 202. In some examples, the kinematics model can be utilized along with the lane-keeping tracker to determine next lateral data, based on the lateral data 118 (e.g., the lateral offset).

The kinematics model can be utilized along with one or more models (e.g., the least squares model) of various types, to determine the next lateral data and/or next longitudinal data. The kinematics model can be integrated and utilized to determine, based on the current lateral data and the current longitudinal data, the next point associated with the tracker trajectory 202.

The next point, the next lateral data, and/or the next longitudinal data can be determined by propagating the bounding box 204 at the time t0 to be a bounding box 206 at a time t1 (or a second time), associated with the next point. The next point can be associated with the next lateral data and the next longitudinal data, at the time t1. The next lateral data and the next longitudinal data can be orthogonally projected onto the reference trajectory 108, as an orthogonal projection 208, at the time t1.

Although the kinematics model can be utilized to identify, for example, the next point based on the current point, as discussed above in the current disclosure, it is not limited as such. In some examples, because the reference trajectory 108 can be determined based on, and/or can include, a series of points (e.g., waypoints), which may or may not be utilized to map the current position of the vehicle 106 to the reference trajectory 108, various models can be usable to implement the kinematics model. In those examples, the kinematics model can be implemented as one or more models including a lateral kinematics model and/or a longitudinal kinematics model.

The kinematics model can be iteratively used, as discussed above, to determine, based on other lateral data (e.g., additional lateral data) and/or other longitudinal data (e.g., additional longitudinal data), other points associated with the tracker trajectory 202. In some examples, projections (e.g., orthogonal projections, perpendicular to the reference trajectory 108), as discussed above, and predictions utilizing the kinematics model can be repeated and iteratively utilized to determine the tracker trajectory 202 (e.g., the next point, such as a point at a center of the bounding box 206, can be orthogonally projected, as depicted in FIG. 2, and utilized, along with the kinematics model to determine another next point). The kinematics model can be integrated any number of times to identify any number of lateral data and/or any number of longitudinal data until a tracker trajectory point (e.g., a point on the tracker trajectory determined based on the kinematics model) i) projects onto a stop point on the reference trajectory, and/or ii) aligns with (or reaches) a fixed time horizon, as discussed below in further detail.

Because an iterative process may be utilized to project the current location of the bounding box onto the reference trajectory 108, other locations (e.g., the next location) of the bounding box can be determined. The process can be repeated until the tracker trajectory 202 converges with the reference trajectory 108, with respect to lateral data and longitudinal data, or until a stop point is reached, as discussed below in further detail. The iterative process can be utilized to simulate processing that would be performed by the tracker component 314 of the vehicle 106.

By utilizing the tracker trajectory to validate the reference trajectory 108, a potential collision with an object (e.g., an object 210) can be avoided which accounts for potential deviations from the reference trajectory 108. By way of example, the object 210 may be located in the environment through which the vehicle 106 is travelling. The tracker trajectory 202 can be utilized, for example, to iteratively propagate the bounding box, starting at bounding box 204, along the tracker trajectory 202 until the tracker trajectory bounding box 212 at time tN is determined. Because the tracker trajectory 202 accurately represents predicted locations of the vehicle 106 at various times, a potential collision with the object 210 can be avoided by controlling the vehicle 106 to utilize, for example, a safe-stop trajectory instead of the reference trajectory 108. The potential collision, which might otherwise have remained undetected in a scenario in which a bounding box (e.g., a reference trajectory bounding box 214 at the time tN) propagated along the reference trajectory 108 is utilized for collision checking, can be avoided based on utilization of the tracker trajectory bounding box 212.

The kinematics model can be used for a constant time period over a fixed time horizon or a stop point to identify the next lateral data and the next longitudinal data. In some examples, a stop point can be associated with various portions of the environment through which the vehicle 106 travels. By way of example, the stop point can be associated with the vehicle 106 approaching a stop sign, a stop light, a stop line, another object, etc.

The fixed time horizon can be a predetermined horizon utilized to stop iterative processing utilizing the kinematics model. The fixed time horizon can be associated with a time (e.g., 0.01 second (s), 0.01 s, 0.1 s, 1 s, etc.) at an iteration having passed since performing analysis via an initial iteration for the bounding box 206 at the initial time t0. The fixed time horizon can be utilized to determine a number of iterations utilized to propagate the bounding box associated with the vehicle 106, to validate the reference trajectory 108. The control model and the motion model can be utilized in one or more iterations to validate the reference trajectory 108, via various techniques as discussed above, until a time associated with a location of the bounding box for an iteration meets or exceeds a threshold time associated with the fixed time horizon.

By utilizing the tracker trajectory 202 for validation of the reference trajectory 108, an accuracy level associated with validation of the reference trajectory 108 can be respectively greater than for validation being otherwise performed utilizing the reference trajectory 108. The accuracy level associated with validation of the reference trajectory 108 can be respectively greater by utilizing the tracker trajectory 202, as a result of the tracker trajectory 202 being generated based on more accurate and/or current data associated with the vehicle 106 than the data utilized to generate the reference trajectory 108.

In some examples, multiple trajectories (e.g., one or more reference trajectories, one or more safe stop trajectories, etc.) can be validated. By way of example, the reference trajectory 108 can be validated, another trajectory 108 (or a first safe-stop trajectory), and/or another trajectory (or a second safe-stop trajectory) can be validated. A comparison between a first likelihood of collision determined based on the reference trajectory 108, a second likelihood of collision determined based on the first safe-stop trajectory, and a second likelihood of collision determined based on the second safe-stop trajectory can be determined. In some examples, the vehicle 106 can be controlled based on a trajectory from among the reference trajectory 108, the first safe-stop trajectory, and the second safe-stop trajectory being associated with a lowest likelihood of collision. The trajectory associated with the lowest likelihood of collision can be transmitted to the tracker component 314, as discussed below with reference to FIG. 3.

Figure 3:
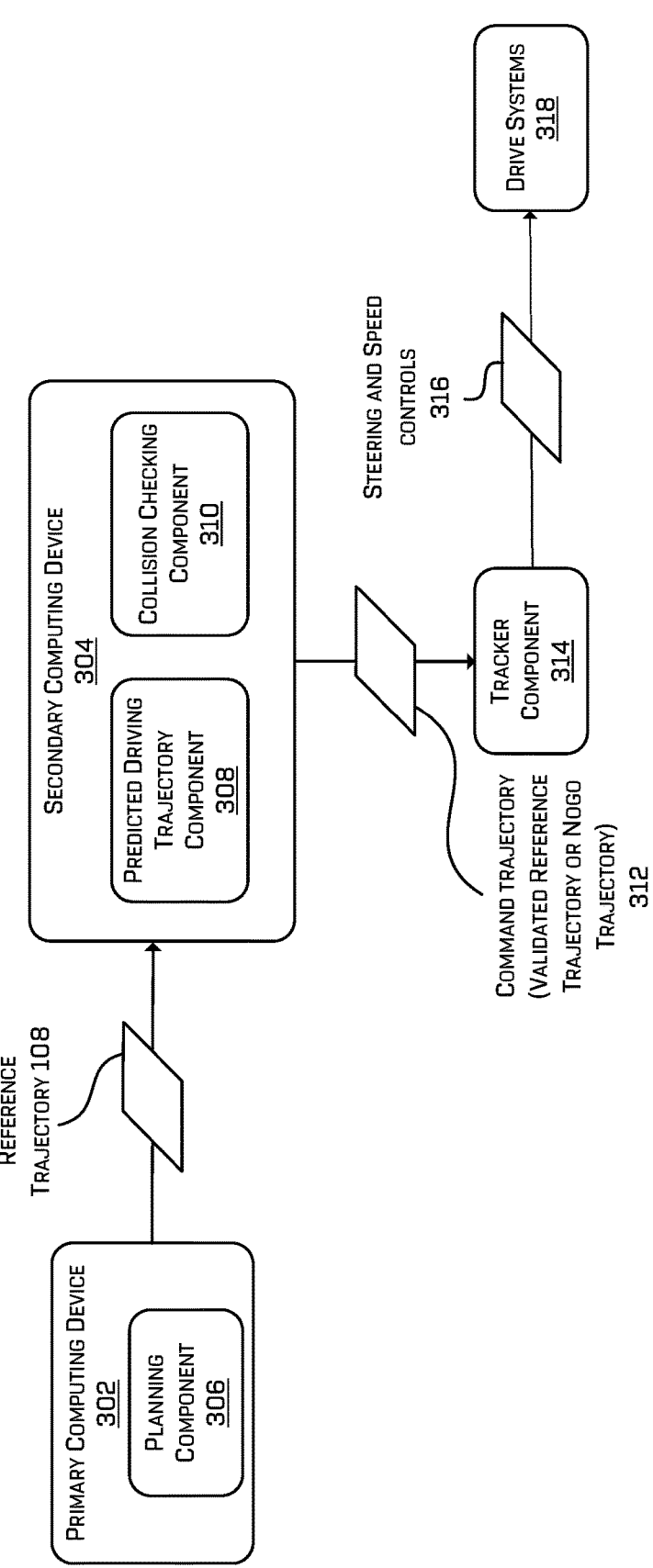
FIG. 3 depicts a block diagram of vehicle system components for implementing the techniques described herein.

FIG. 3 depicts a block diagram of vehicle system components 300 for implementing the techniques described herein. The vehicle system components 300 can include a primary computing device 302 and a secondary computing device 304. The primary computing device 302 can be utilized to implement the primary computing device of the vehicle 106 as discussed above with reference to FIG. 1. The secondary computing device 304 can be utilized to implement the secondary computing device of the vehicle 106 as discussed above with reference to FIG. 1.

The primary computing device 302 can include a planning component 306. The planning component 306 can be utilized to perform any techniques of the primary computing device as discussed above with reference to FIG. 1. For example, the planning component 306 can be generate multiple candidate trajectories, and generate an optimized trajectory, based on the candidate trajectories. The optimized trajectory can be transmitted, as a reference trajectory (e.g., the reference trajectory 108).

The secondary computing device 304 can include a predicted driving trajectory component (or "simulated driving trajectory component") 308 and a collision checking component 310. The secondary computing device 304 can receive the reference trajectory 108. In some examples, the reference trajectory can be received by the secondary computing device 304, via the predicted driving trajectory component 308. The predicted driving trajectory component 308 can generate the tracker trajectory (e.g., the tracker trajectory 126) based on the reference trajectory 108.

The collision checking component 310 can perform collision checking utilizing the tracker trajectory 126. The collision checking of the tracker trajectory 126, which can be generated via a kinematics model, can be utilized to validate the reference trajectory 108. The validated reference trajectory 108, or an alternate trajectory, can be output as a command trajectory 312. By way of example, validated reference trajectory 108 can be output as the command trajectory 312, or an alternate trajectory (e.g., a first safe stop trajectory, a second safe stop trajectory, etc.) can be output as the command trajectory 312.

The command trajectory 312 output by the collision checking component 310 can be input by a tracker component 314. The tracker component 314 can analyze the command trajectory 312 and utilize the command trajectory 312 to generate controls (e.g., steering and/or speed controls) 316 to control the vehicle 106.

The tracker component 314 can output the controls 316 to one or more drive systems (e.g., drive systems) 318. The drive systems 318 can be utilized to control the vehicle 106 based on the controls (e.g., steering and/or speed controls). By way of example, controlling the vehicle 106 can include controlling a velocity, an acceleration (e.g., increase or decreasing speed), an orientation (e.g., pose, tilt), etc. of the vehicle 106 via any vehicle system/component of any type.

FIG. 4 is a block diagram of an example system 400 for implementing the techniques described herein. In at least one example, the system 400 can include a vehicle 402. In the illustrated example system 400, the vehicle 402 can be an autonomous vehicle; however, the vehicle 402 can be any other type of vehicle. In some examples, the vehicle 402 may be utilized to implement the vehicle, as discussed above with reference to FIG. 1.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 402 can include one or more first computing devices 404, one or more sensor systems 406, one or more emitters 408, one or more communication connections 410 (also referred to as communication devices and/or modems), at least one direct connection 412 (e.g., for physically coupling with the vehicle 402 to exchange data and/or to provide power), and one or more drive systems 414. By way of example, the first computing device(s) 404 may be considered to be a primary system. In some examples, the first computing device(s) 404 may be utilized to implement the primary computing device 302, as discussed above with reference to FIG. 3. The one or more sensor systems 406 can be configured to capture sensor data associated with an environment.

The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the first computing device(s) 404.

The vehicle 402 can also include emitter(s) 408 for emitting light and/or sound. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include communication connection(s) 410 that enable communication between the vehicle 402 and one or more other local or remote computing device(s) (e.g., a remote teleoperation computing device) or remote services. For instance, the communication connection(s) 410 can facilitate communication with other local computing device(s) on the vehicle 402 and/or the drive system(s) 414. Also, the communication connection(s) 410 can allow the vehicle 402 to communicate with other nearby computing device(s) (e.g., other nearby vehicles, traffic signals, etc.).

The communications connection(s) 410 can include physical and/or logical interfaces for connecting the first computing device(s) 404 to another computing device or one or more external networks 416 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include the sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s). In some examples, the drive system(s) 414 may be utilized to implement the drive system(s) 318, as discussed above with reference to FIG. 3.

The vehicle 402 can include one or more second computing devices 418 to provide redundancy, error checking, and/or validation of determinations and/or commands determined by the first computing device(s) 404. By way of example, while the first computing device(s) 404 may be considered to be the primary system, the second computing device(s) 418 may be considered to be a secondary system. In some examples, the second computing device(s) 418 may be utilized to implement the secondary computing device 304, as discussed above with reference to FIG. 3.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference and for all purposes.

The first computing device(s) 404 can include one or more processors 420 and memory 422 communicatively coupled with the one or more processors 420. In the illustrated example, the memory 422 of the first computing device(s) 404 stores a localization component 424, a perception component 426, a prediction component 428, a planning component 430, a maps component 432, and one or more system controllers 434. Though depicted as residing in the memory 422 for illustrative purposes, it is contemplated that the localization component 424, the perception component 426, the prediction component 428, the planning component 430, the maps component 432, and the one or more system controllers 434 can additionally, or alternatively, be accessible to the first computing device(s) 404 (e.g., stored in a different component of vehicle 402 and/or be accessible to the vehicle 402 (e.g., stored remotely).

In memory 422 of the first computing device 404, the localization component 424 can include functionality to receive data from the sensor system(s) 406 to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory, as discussed herein.

The perception component 426 can include functionality to perform object detection, segmentation, and/or classification. In some examples, the perception component 426 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional or alternative examples, the perception component 426 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 426 can use perception algorithms to determine a perception-based bounding box associated with an object in the environment based on sensor data and/or a predicted trajectory associated with such an object. For example, the perception component 426 can receive image data and classify the image data to determine that an object is represented in the image data. Then, using detection algorithms, the perception component 426 can generate a two-dimensional bounding box and/or a perception-based three-dimensional bounding box associated with the object. The perception component 426 can further generate a three-dimensional bounding box associated with the object. As discussed above, the three-dimensional bounding box can provide additional information such as a location, orientation, pose, and/or size (e.g., length, width, height, etc.) associated with the object.

The perception component 426 can include functionality to store perception data generated by the perception component 426. In some instances, the perception component 426 can determine a track corresponding to an object that has been classified as an object type. For purposes of illustration only, the perception component 426, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 402. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 428 can generate one or more probability maps representing prediction probabilities of possible locations of one or more objects in an environment. For example, the prediction component 428 can generate one or more probability maps for vehicles, pedestrians, animals, and the like within a threshold distance from the vehicle 402. In some instances, the prediction component 428 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 430 can determine a path for the vehicle 402 to follow to traverse through an environment. For example, the planning component 430 can determine various routes and paths and various levels of detail. In some instances, the planning component 430 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 430 can generate an instruction for guiding the autonomous vehicle along at least a portion of the route from the first location to the second location. In some examples, the planning component 430 may be utilized to implement the planning component 306, as discussed above with reference to FIG. 3.

In at least one example, the planning component 430 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 430 can alternatively, or additionally, use data from the perception component 426 and/or the prediction component 428 to determine a path for the vehicle 402 to follow to traverse through an environment. For example, the planning component 430 can receive data from the perception component 426 and/or the prediction component 428 regarding objects associated with an environment. Using this data, the planning component 430 can determine a route to travel from a first location (e.g., a current location) to a second location (e.g., a target location) to avoid objects in an environment. In at least some examples, such a planning component 430 may determine there is no such collision free path and, in turn, provide a path which brings vehicle 402 to a safe stop avoiding all collisions and/or otherwise mitigating damage.

The memory 422 can further include one or more maps 432 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 432 can include at least one map (e.g., images and/or a mesh). In some examples, the vehicle 402 can be controlled based at least in part on the map(s) 432. That is, the map(s) 432 can be used in connection with the localization component 424, the perception component 426, the prediction component 428, and/or the planning component 430 to determine a location of the vehicle 402, identify objects in an environment, generate prediction probabilit(ies) associated with objects and/or the vehicle 402, and/or generate routes and/or trajectories to navigate within an environment.

In some examples, the one or more maps 432 can be stored on a remote computing device(s) (such as the computing device(s) 452) accessible via network(s) 416. In some examples, multiple maps 432 can be stored based on, for example, a characteristic (e.g., type of entity, time of day, day of week, season of the year, etc.). Storing multiple maps 432 can have similar memory requirements but can increase the speed at which data in a map can be accessed.

In at least one example, the first computing device(s) 404 can include one or more system controller(s) 434, which can be configured to control steering, propulsion, braking, safety, emitters, communication, and other systems of the vehicle 402. These system controller(s) 434 can communicate with and/or control corresponding systems of the drive system(s) 414 and/or other components of the vehicle 402, which may be configured to operate in accordance with a path provided from the planning component 430.

The second computing device(s) 418 can comprise one or more processors 436 and memory 438 including components to verify and/or control aspects of the vehicle 402, as discussed herein. In at least one instance, the one or more processors 436 can be similar to the processor(s) 420 and the memory 438 can be similar to the memory 422. However, in some examples, the processor(s) 436 and the memory 438 may comprise different hardware than the processor(s) 420 and the memory 422 for additional redundancy. In some examples, the memory 438 can comprise a localization component 440, a perception/prediction component 442, one or more system controllers 444, and a planning component 446.

In some examples, the localization component 440 may receive sensor data from the sensor(s) 406 to determine one or more of a position and/or orientation (together a pose) of the autonomous vehicle 402. Here, the position and/or orientation may be relative to point(s) and/or object(s) in an environment in which the autonomous vehicle 402 is located. In examples, the orientation may include an indication of a yaw, roll, and/or pitch of the autonomous vehicle 402 relative to a reference plane and/or relative to point(s) and/or object(s). In examples, the localization component 440 may perform less processing than the localization component 424 of the first computing device(s) 404 (e.g., higher-level localization). For instance, the localization component 440 may not determine a pose of the autonomous vehicle 402 relative to a map, but merely determine a pose of the autonomous vehicle 402 relative to objects and/or surfaces that are detected around the autonomous vehicle 402 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data. In some examples, the localization component 440 can be omitted and localization information can be determined by the first computing device 404 and provided to the second computing device 418.

In some examples, the perception/prediction component 442 can include functionality to detect, identify, classify, and/or track object(s) represented in sensor data. For example, the perception/prediction component 442 can perform the clustering operations and operations to estimate or determine a height associated with objects, as discussed herein.

In some examples, the perception/prediction component 442 may comprise an M-estimator, but may lack an object classifier such as, for example, a neural network, decision tree, and/or the like for classifying objects. In additional or alternate examples, the perception/prediction component 442 may comprise an ML model of any type, configured to disambiguate classifications of objects. By contrast, the perception component 426 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 442 (and/or 426) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 442 may also process the input data to determine one or more predicted trajectories for an object. For example, based on a current position of an object and a velocity of the object over a period of a few seconds, the perception/prediction component 442 may predict a path that the object will move over the next few seconds. In some examples, such a predicted path may comprise using linear assumptions of motion given a position, orientation, velocity, and/or orientation. In other examples, such predicted paths may comprise more complex analyses. Additional examples of detecting objects and determining predicted object trajectories can be found, for example, in U.S. patent application Ser. No. 17/514,542 titled "Collision Avoidance and Mitigation in Autonomous Vehicles" and filed Oct. 29, 2021, the entirety of which is herein incorporated by reference and for all purposes. Additional examples of detecting object classifications for trajectory validation can be found, for example, in U.S. patent application Ser. No. 16/588,717 titled "Complex Ground Profile Estimation" and filed Sep. 30, 2019, the entirety of which is herein incorporated by reference. Additional examples of determining perception information utilized for trajectory selection can be found, for example, in U.S. patent application Ser. No. 17/116,888 titled "Perception System Velocity Determination" and filed Dec. 9, 2020, the entirety of which is herein incorporated by reference and for all purposes.

In some examples, the system controller(s) 444 can include functionality to control safety critical components (e.g., steering, braking, motors, etc.) of the vehicle. In this manner, the second computing device(s) 418 can provide redundancy and/or an additional hardware and software layer for vehicle safety. In some examples, the system controller(s) 444 may be utilized to implement the tracker component 314, as discussed above with reference to FIG. 3.

In some examples, the planning component 446 can include a predicted driving trajectory component 448 and a collision checking component 450. In some examples, the predicated driving trajectory component 448 can be utilized to implement the predicted driving trajectory component 308. In those or other examples, the collision checking component 450 can be utilized to implement the collision checking component 310. By way of example, the predicted driving trajectory component 448 can receive, from the planning component 430, the reference trajectory (e.g., the reference trajectory 108) as described in detail above. The predicted driving trajectory component 448 can utilize the reference trajectory to generate a tracker trajectory (e.g., the tracker trajectory 202). The collision checking component 450 can perform collision checking utilizing the tracker trajectory to validate the reference trajectory. The collision checking component 450 can output, to the drive system(s) 414, a command trajectory 312 based on validation of the reference trajectory.

The vehicle 402 can connect to computing device(s) 452 via the network 416 and can include one or more processors 454 and memory 456 communicatively coupled with the one or more processors 454. In at least one instance, the one or more processors 454 can be similar to the processor(s) 420 and the memory 456 can be similar to the memory 422. In the illustrated example, the memory 456 of the computing device(s) 452 stores a component(s) 458, which may correspond to any of the components discussed herein.

The processor(s) 420, 436, and/or 454 can be any suitable processor capable of executing instructions to process data and perform operations as described herein. By way of example and not limitation, the processor(s) 420, 436, and/or 454 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 422, 438, and/or 456 are examples of non-transitory computer-readable media. The memory 422, 438, and/or 456 can store an operating system and one or more software applications, instructions, programs, and/or data to implement the methods described herein and the functions attributed to the various systems. In various implementations, the memory 422, 438, and/or 456 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 422, 438, and/or 456 can be implemented as a neural network. In some examples, the components in the memory 422, 438, and/or

456 may not include machine learning algorithm to reduce complexity and to be verified and/or certified from a safety standpoint.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

FIG. 5 depicts an example process for reference trajectory validating and collision checking management, in accordance with examples of the disclosure.

At operation 502, example process 500 can include receiving a reference trajectory 108. The reference trajectory 108 for the vehicle 106 to follow can be received, from the first computing component of the vehicle 106 and by the second computing component of the vehicle 106.

At operation 504, example process 500 can include determining an offset of the vehicle. Offset data including the at least one offset can be determined based on the reference trajectory 108. The offset data can include the lateral data 118 and/or the longitudinal data 120. The lateral data 118 can include a lateral offset. The longitudinal data 120 can include a longitudinal offset. The lateral offset and/or the longitudinal offset can be determined as the at least one offset based on the reference trajectory 108.

At operation 506, example process 500 can include determining a predicted tracker trajectory that the vehicle will follow. The predicted tracker trajectory can be determined as a tracker trajectory (e.g., the tracker trajectory 126).

At operation 508, example process 500 can include determining predicted collision data. The predicted collision checking can be performed by utilizing the tracker trajectory 126 to determine a likelihood of collision associated with an object in the environment.

At operation 510, example process 500 can include validating the reference trajectory 108. The reference trajectory 108 can be validated as a valid reference trajectory based on determining that a likelihood of collision associated with the tracker trajectory 126 is less than or equal to a threshold likelihood (including no collision whatsoever).

At operation 512, example process 500 can include determining whether the reference trajectory has been validated to be a valid reference trajectory. The example process 500 can proceed to operation 514 based on determining the reference trajectory 108 has not been validated to be the valid reference trajectory. The example process 500 can proceed to operation 516 based on determining the reference trajectory 108 has been validated to be the valid reference trajectory.

At operation 514, example process 500 can include controlling the vehicle 106 to follow an alternate trajectory. The alternate trajectory can be utilized to control the vehicle 106 by outputting the alternate trajectory as the control trajectory based on determining there is a likelihood of collision associated with the tracker trajectory 126.

At operation 516, example process 500 can include controlling the vehicle 106 to follow the reference trajectory. The valid reference trajectory can be utilized to control the vehicle 106 by outputting the reference trajectory 108 as the control trajectory based on determining there is no likelihood of collision associated with the tracker trajectory 126.

EXAMPLE CLAUSES

A: A system comprising: one or more processors; and one or more computer-readable media storing instructions executable by the one or more processors, wherein the instructions, when executed, cause the system to perform operations comprising: receiving, from a primary computing component, a reference trajectory for an autonomous vehicle to follow; determining, by a secondary computing component, a lateral offset and a longitudinal offset of the autonomous vehicle with respect to the reference trajectory; determining, based at least in part on the lateral offset, the longitudinal offset, and a kinematics model, a tracker trajectory that the autonomous vehicle is predicted to drive to converge to the reference trajectory; detecting an object proximate the autonomous vehicle; determining, based at least in part on the tracker trajectory and the object, a likelihood of collision between the autonomous vehicle and the object; and controlling the autonomous vehicle based at least in part on the likelihood of collision.

B: The system of paragraph A, wherein determining the tracker trajectory comprises using a least squares model, and wherein the operations further comprise determining a longitudinal control for the tracker trajectory based at least in part on the least squares model.

C: The system of paragraph A or B, the operations further comprising: iteratively determining the tracker trajectory based at least in part on at least one of a fixed time horizon or reaching a stopping point associated with the reference trajectory.

D: The system of any of paragraphs A-C, wherein controlling the autonomous vehicle further comprises: controlling the autonomous vehicle to follow the reference trajectory or a safe-stop trajectory.

E: The system of any of paragraphs A-D, wherein determining the tracker trajectory comprises: determining a heading offset associated with the autonomous vehicle with respect to the reference trajectory; determining, based at least in part on the heading offset, heading data that the autonomous vehicle is predicted to utilize to follow the reference trajectory; determining an acceleration offset associated with the autonomous vehicle with respect to the reference trajectory; and determining, based at least in part on the acceleration offset, acceleration data that the autonomous vehicle is predicted to utilize to drive the reference trajectory.

F: One or more non-transitory computer-readable media storing instructions executable by one or more processors, wherein the instructions, when executed, cause the one or more processors to perform operations comprising: receiving a first trajectory for a vehicle to follow; determining an offset of the vehicle based at least in part on the first trajectory; determining, based at least in part on the offset, a second trajectory that the vehicle is predicted to drive to return to the first trajectory; determining a likelihood of collision between the vehicle and an object proximate the vehicle based at least in part on the second trajectory; and controlling the vehicle based at least in part on the likelihood of collision.

G: The one or more non-transitory computer-readable media of paragraph F, wherein the offset comprises a lateral offset and a longitudinal offset, and wherein determining the second trajectory further comprises determining the second trajectory, based at least in part on the lateral offset, the longitudinal offset, and a kinematics model.

H: The one or more non transitory computer readable media of paragraph F or G, wherein determining the likelihood of collision comprises determining an estimated position of the vehicle along the second trajectory.

I: The one or more non-transitory computer-readable media of any of paragraphs F-H, wherein determining the second trajectory comprises using a least squares model, and wherein the operations further comprise determining a longitudinal control for the second trajectory based at least in part on the least squares model.

J: The one or more non-transitory computer-readable media of any of paragraphs F-I, the operations further comprising: iteratively determining the second trajectory based at least in part on at least one of a fixed time horizon or reaching a stopping point associated with the second trajectory.

K: The one or more non-transitory computer-readable media of any of paragraphs F-J, wherein the offset is determined based on a current position of the vehicle, and the current position is received from a primary computing device.

L: The one or more non-transitory computer-readable media of any of paragraphs F-K, wherein the offset is determined as an orthogonal projection of a current position of the vehicle on the first trajectory.

M: The one or more non-transitory computer-readable media of any of paragraphs F-L, wherein determining the second trajectory further includes performing an integration of a kinematics model based at least in part on the offset.

N: The one or more non-transitory computer-readable media of any of paragraphs F-M, wherein: the offset includes a lateral offset; and determining the offset includes utilizing a lane-keeping algorithm to determine lateral error data associated with at least one of lateral data associated with the vehicle or a yaw of the vehicle.

O: The one or more non-transitory computer-readable media of any of paragraphs F-N, wherein controlling the vehicle comprises: controlling the vehicle to controlling the vehicle to follow the first trajectory based on the likelihood of collision being less than or equal to a threshold likelihood, or controlling the vehicle to execute a safe stop trajectory based on the likelihood of collision being greater than the threshold likelihood.

P: The one or more non-transitory computer-readable media of any of paragraphs F-O, wherein the offset includes a longitudinal offset, the operations further comprising: determining, based at least in part on a difference between a measured velocity of the vehicle and a reference velocity associated with the first trajectory, the longitudinal offset.

Q: A method comprising: receiving a first trajectory for a vehicle to follow; determining an offset of the vehicle relative to the first trajectory; determining, based at least in part on the offset, a second trajectory that the vehicle is predicted to drive to return to the first trajectory; determining a likelihood of collision between the vehicle and an object proximate the vehicle based at least in part on the second trajectory; and controlling the vehicle based at least in part on the likelihood of collision.

R: The method of paragraph Q, wherein the offset comprises a lateral offset and a longitudinal offset, and wherein determining the second trajectory further comprises determining the second trajectory, based at least in part on the lateral offset, the longitudinal offset, and a kinematics model.

S: The method of paragraph Q or R, wherein determining the likelihood of collision comprises determining an estimated position of the vehicle along the second trajectory.

T: The method of any of paragraphs Q-S, wherein determining the second trajectory comprises using a least squares model, and wherein the operations further comprise determining a longitudinal control for the second trajectory based at least in part on the least squares model.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving, from a primary computing component at a secondary computing component, a reference trajectory for an autonomous vehicle to follow;
determining, by the secondary computing component, a lateral offset and a longitudinal offset of the autonomous vehicle based at least in part on an expected location of the autonomous vehicle along the reference trajectory;
iteratively determining, based at least in part on the lateral offset, the longitudinal offset, and a kinematics model, a tracker trajectory that the autonomous vehicle is predicted to drive to converge to the reference trajectory until the tracker trajectory projects onto a stop point along the reference trajectory;
detecting an object proximate the autonomous vehicle;
determining, by the primary computing component and based at least in part on the reference trajectory, a first likelihood of collision between the autonomous vehicle and the object;
determining, by the secondary computing component and based at least in part on the tracker trajectory, a second likelihood of collision between the autonomous vehicle and the object; and
controlling the autonomous vehicle to follow the reference trajectory or a safe-stop trajectory based at least in part on the first likelihood of collision and the second likelihood of collision.

2. The system of claim 1, wherein determining the tracker trajectory comprises using a least squares model, wherein the operations further comprise determining a longitudinal control for the tracker trajectory based at least in part on the least squares model.

3. The system of claim 1, wherein determining the tracker trajectory comprises:
determining a heading offset associated with the autonomous vehicle with respect to the reference trajectory;
determining, based at least in part on the heading offset, heading data that the autonomous vehicle is predicted to utilize to follow the reference trajectory;

determining an acceleration offset associated with the autonomous vehicle with respect to the reference trajectory; and determining, based at least in part on the acceleration offset, acceleration data that the autonomous vehicle is predicted to utilize to drive the reference trajectory.

4. The system of claim 1, wherein iteratively determining the tracker trajectory is based at least in part on a fixed time horizon associated with the reference trajectory.

5. The system of claim 4, wherein the fixed time horizon represents a time at an iteration having passed since determining a first tracker trajectory the autonomous vehicle is predicted to drive to converge to the reference trajectory.

6. One or more non-transitory computer-readable media storing instructions executable by one or more processors, wherein the instructions, when executed, cause the one or more processors to perform operations comprising:

receiving a first trajectory for a vehicle to follow in an environment, the first trajectory received from a primary computing component at a secondary computing component;

determining, by the secondary computing component, an offset of the vehicle based at least in part on an expected location of the vehicle along the first trajectory;

iteratively determining, based at least in part on the offset, a second trajectory that the vehicle is predicted to drive to return to the first trajectory until the second trajectory projects onto a stop point along the first trajectory;

determining, by the primary computing component and based at least in part on the first trajectory, a first likelihood of collision between the vehicle and an object proximate the vehicle;

determining, by the secondary computing component and based at least in part on the second trajectory, a second likelihood of collision between the vehicle and the object; and controlling the vehicle to follow the second trajectory or a safe stop trajectory based at least in part on the first likelihood of collision and the second likelihood of collision.

7. The one or more non-transitory computer-readable media of claim 6, wherein the offset comprises a lateral offset and a longitudinal offset, wherein determining the second trajectory further comprises determining the second trajectory, based at least in part on the lateral offset, the longitudinal offset, and a kinematics model.

8. The one or more non-transitory computer-readable media of claim 6, wherein determining the first likelihood of collision comprises determining an estimated position of the vehicle along the second trajectory.

9. The one or more non-transitory computer-readable media of claim 6, wherein determining the second trajectory comprises using a least squares model, wherein the operations further comprise determining a longitudinal control for the second trajectory based at least in part on the least squares model.

10. The one or more non-transitory computer-readable media of claim 6, wherein the offset is determined based on a current position of the vehicle, and the current position is received from a primary computing device.

11. The one or more non-transitory computer-readable media of claim 6, wherein the offset is determined as an orthogonal projection of a current position of the vehicle on the first trajectory.

12. The one or more non-transitory computer-readable media of claim 6, wherein determining the second trajectory further includes performing an integration of a kinematics model based at least in part on the offset.

13. The one or more non-transitory computer-readable media of claim 6, wherein:

the offset includes a lateral offset; and determining the offset includes utilizing a lane-keeping algorithm to determine lateral error data associated with at least one of lateral data associated with the vehicle or a yaw of the vehicle.

14. The one or more non-transitory computer-readable media of claim 6, wherein controlling the vehicle comprises:

controlling the vehicle to follow the first trajectory based on the first likelihood of collision being less than or equal to a threshold likelihood, or controlling the vehicle to execute a safe stop trajectory based on the first likelihood of collision being greater than the threshold likelihood.

15. The one or more non-transitory computer-readable media of claim 6, wherein the offset includes a longitudinal offset, the operations further comprising:

determining, based at least in part on a difference between a measured velocity of the vehicle and a reference velocity associated with the first trajectory, the longitudinal offset.

16. A method comprising:

receiving a first trajectory for a vehicle to follow, the first trajectory received from a primary computing component at a secondary computing component;

determining, by the secondary computing component, an offset of the vehicle based at least in part on an expected position of the vehicle along the first trajectory;

iteratively determining, based at least in part on the offset, a second trajectory that the vehicle is predicted to drive to return to the first trajectory until the second trajectory projects onto a stop point along the first trajectory;

determining, by the primary computing component and based at least in part on the first trajectory, a first likelihood of collision between the vehicle and an object proximate the vehicle;

determining, by the secondary computing component and based at least in part on the second trajectory, a second likelihood of collision between the vehicle and the object; and controlling the vehicle to follow the second trajectory or a safe stop trajectory based at least in part on the first likelihood of collision and the second likelihood of collision.

17. The method of claim 16, wherein the offset comprises a lateral offset and a longitudinal offset, wherein determining the second trajectory further comprises determining the second trajectory, based at least in part on the lateral offset, the longitudinal offset, and a kinematics model.

18. The method of claim 16, wherein determining the first likelihood of collision comprises determining an estimated position of the vehicle along the second trajectory.

19. The method of claim 16, wherein determining the second trajectory comprises using a least squares model, and the method further comprising determining a longitudinal control for the second trajectory based at least in part on the least squares model.

20. The method of claim 16, wherein determining the second likelihood of collision comprises propagating a representation of the vehicle along the second trajectory, and wherein the representation of the vehicle comprises a bounding box associated with the vehicle.

* * * * *